US009498727B2

(12) United States Patent
Bolger et al.

(10) Patent No.: US 9,498,727 B2
(45) Date of Patent: *Nov. 22, 2016

(54) PRE-FETCHING ITEMS IN A VIRTUAL UNIVERSE BASED ON AVATAR COMMUNICATIONS

(71) Applicant: International Business Machines Corporation, Armonk, NY (US)

(72) Inventors: Rosa M. Bolger, Austin, TX (US); Ann M. Corrao, Raleigh, NC (US); Rick A. Hamilton, II, Charlottesville, VA (US); Brian M. O'Connell, Cary, NC (US); Brian J. Snitzer, Lancaster, PA (US)

(73) Assignee: International Business Machines Corporation, Armonk, NY (US)

( * ) Notice: Subject to any disclaimer, the term of this patent is extended or adjusted under 35 U.S.C. 154(b) by 15 days.

This patent is subject to a terminal disclaimer.

(21) Appl. No.: 14/591,202

(22) Filed: Jan. 7, 2015

(65) Prior Publication Data
US 2015/0127664 A1 May 7, 2015

Related U.S. Application Data

(63) Continuation of application No. 12/473,306, filed on May 28, 2009, now Pat. No. 8,990,306.

(51) Int. Cl.
*G06F 15/16* (2006.01)
*A63F 13/87* (2014.01)
*H04L 29/08* (2006.01)
(Continued)

(52) U.S. Cl.
CPC .............. *A63F 13/87* (2014.09); *A63F 13/12* (2013.01); *G06F 17/30722* (2013.01); *G06F 17/30902* (2013.01); *H04L 67/22* (2013.01); *H04L 67/2847* (2013.01); *H04L 67/38* (2013.01);
(Continued)

(58) Field of Classification Search
CPC .... H04L 67/2847; H04L 67/22; H04L 67/38
USPC .......................................... 709/201, 203–205
See application file for complete search history.

(56) References Cited

U.S. PATENT DOCUMENTS 5,956,039 A 9/1999 Woods et al.
6,175,842 B1 1/2001 Kirk et al.
(Continued)

OTHER PUBLICATIONS

U.S. Appl. No. 12/548,831, Office Action dated Jul. 19, 2012, 23 pages.
U.S. Appl. No. 12/548,831, Office Action dated Dec. 19, 2012, 29 pages.
U.S. Appl. No. 12/548,831, Office Action dated Jun. 3, 2013, 26 pages.
U.S. Appl. No. 12/548,831, Office Action dated Oct. 11, 2013, 28 pages.
U.S. Appl. No. 12/548,831, Office Action dated Feb. 25, 2014, 37 pages.
(Continued)

*Primary Examiner* — Minh-Chau Nguyen
(74) *Attorney, Agent, or Firm* — William H. Hartwell; Maxine L. Barasch; Keohane & D'Alessandro PLLC

(57) ABSTRACT

The present invention pre-fetches objects, textures and scripts (collectively referred to herein as items) through analysis of the communications of an avatar. Furthermore, if an object, texture or script is not pre-fetched upon arrival to a region the virtual universe's object, texture and script download system is augmented to prioritize objects the user may be interested in based on the avatar's communications and previously stated priorities. The present invention may improve user experience of virtual world by prioritizing the download and caching of objects, textures, and scripts that are likely to interest the user. Such a prioritization enhances the user experience by reducing wait times for the rendering of objects of interest.

20 Claims, 7 Drawing Sheets

(51) Int. Cl.
*H04L 29/06* (2006.01)
*G06F 17/30* (2006.01)
*A63F 13/30* (2014.01)

(52) U.S. Cl.
CPC .... *A63F2300/534* (2013.01); *A63F 2300/552* (2013.01); *A63F 2300/572* (2013.01)

(56) References Cited

U.S. PATENT DOCUMENTS

| | | |
|---|---|---|
| 6,179,713 B1 | 1/2001 | James et al. |
| 6,219,045 B1 | 4/2001 | Leahy et al. |
| 6,329,986 B1 | 12/2001 | Cheng |
| 6,490,577 B1 | 12/2002 | Anwar |
| 6,519,571 B1 | 2/2003 | Guheen et al. |
| 6,598,125 B2 | 7/2003 | Romm |
| 6,767,287 B1 | 7/2004 | Mcquaid et al. |
| 7,073,129 B1 | 7/2006 | Robarts et al. |
| 7,181,690 B1 | 2/2007 | Leahy et al. |
| 7,206,785 B1 | 4/2007 | Stephens |
| 7,269,632 B2 | 9/2007 | Edeker et al. |
| 7,373,377 B2 | 5/2008 | Altieri |
| 7,797,313 B1 | 9/2010 | Goyal et al. |
| 7,913,176 B1 | 3/2011 | Blattner et al. |
| 8,024,343 B2 | 9/2011 | Gallagher |
| 8,126,985 B1 | 2/2012 | Kandekar et al. |
| 8,601,386 B2 | 12/2013 | Altberg et al. |
| 8,681,144 B2 | 3/2014 | Bolger et al. |
| 8,990,306 B2 | 3/2015 | Bolger et al. |
| 2002/0138607 A1 | 9/2002 | O'Rourke et al. |
| 2002/0188678 A1 | 12/2002 | Edecker et al. |
| 2003/0069780 A1 | 4/2003 | Hailwood et al. |
| 2003/0195735 A1 | 10/2003 | Rosedale et al. |
| 2005/0071306 A1 | 3/2005 | Kruszewski et al. |
| 2006/0031578 A1 | 2/2006 | Pelletier |
| 2006/0184886 A1 | 8/2006 | Chung et al. |
| 2006/0287980 A1 | 12/2006 | Liu et al. |
| 2007/0128899 A1 | 6/2007 | Mayer |
| 2007/0160961 A1 | 7/2007 | Lum |
| 2007/0179867 A1 | 8/2007 | Glazer et al. |
| 2007/0240119 A1 | 10/2007 | Ducheneaut et al. |
| 2007/0255702 A1 | 11/2007 | Orme |
| 2007/0266384 A1 | 11/2007 | Labrou et al. |
| 2007/0277245 A1 | 11/2007 | Goto et al. |
| 2007/0288598 A1 | 12/2007 | Edeker et al. |
| 2008/0071742 A1 | 3/2008 | Yang et al. |
| 2008/0098064 A1 | 4/2008 | Sherinian |
| 2008/0204450 A1 | 8/2008 | Dawson et al. |
| 2008/0208684 A1 | 8/2008 | Hamilton et al. |
| 2008/0263460 A1 | 10/2008 | Altberg et al. |
| 2008/0287192 A1 | 11/2008 | Lee et al. |
| 2008/0303811 A1 | 12/2008 | Van Luchene |
| 2008/0307412 A1 | 12/2008 | Marr et al. |
| 2008/0309671 A1 | 12/2008 | Shuster et al. |
| 2008/0320222 A1 | 12/2008 | Dhodapkar |
| 2009/0046094 A1 | 2/2009 | Hamilton et al. |
| 2009/0165140 A1 | 6/2009 | Robinson et al. |
| 2010/0076962 A1 | 3/2010 | Doyle |
| 2010/0156899 A1 | 6/2010 | Bolger et al. |
| 2010/0164947 A1 | 7/2010 | Bolger et al. |
| 2010/0198869 A1 | 8/2010 | Kalaboukis et al. |
| 2010/0211638 A1 | 8/2010 | Rougier |
| 2010/0306652 A1 | 12/2010 | Bolger et al. |
| 2014/0176567 A1 | 6/2014 | Bolger et al. |

OTHER PUBLICATIONS

U.S. Appl. No. 12/548,831, Office Action dated Jul. 11, 2014, 42 pages.
U.S. Appl. No. 12/548,831, Office Action dated Dec. 10, 2014, 31 pages.
U.S. Appl. No. 12/548,831, Office Action dated May 19, 2015, 28 pages.
Saha et al., "Helping Based on Future Expectations", AAMAS '03, Jul. 14-18, 2003, 8 pages.
Yuan, "A personalized and integrative comparison-shopping engine and its applications", Decision Support Systems 3, 2002, pp. 139-156.
U.S. Appl. No. 14/191,528, Office Action dated Apr. 20, 2015, 35 pages.
Sultana Marcia Zalalee, USPTO Final Office Action, U.S. Appl. No. 12/339,418, Mail Date Aug. 26, 2011, 19 pages.
Sultana Marcia Zalalee, USPTO Office Action, U.S. Appl. No. 12/339,418, Mail Date Feb. 6, 2012, 20 pages.
Sultana Marcia Zalalee, USPTO Final Office Action, U.S. Appl. No. 12/339,418, Mail Date Jun. 15, 2012, 19 pages.
Sultana Marcia Zalalee, USPTO Office Action, U.S. Appl. No. 12/339,418, Mail Date Nov. 21, 2012, 18 pages.
Sultana Marcia Zalalee, USPTO Final Office Action, U.S. Appl. No. 12/339,418, Notification Date Apr. 8, 2013, 27 pages.
Sultana Marcia Zalalee, USPTO Office Action, U.S. Appl. No. 12/339,418, Notification Date Jul. 24, 2013, 30 pages.
Sultana Marcia Zalalee, USPTO Notice of Allowance and Fee(s) Due, U.S. Appl. No. 12/339,418, Date Mailed Nov. 7, 2013, 16 pages.
U.S. Appl. No. 12/473,306, Office Action dated Jun. 9, 2011, 21 pages.
U.S. Appl. No. 12/473,306, Office Action dated Mar. 29, 2012, 21 pages.
U.S. Appl. No. 12/473,306, Office Action dated Feb. 27, 2014, 22 pages.
U.S. Appl. No. 12/473,306, Office Action dated Sep. 10, 2014, 14 pages.
U.S. Appl. No. 12/473,306, Notice of Allowance dated Nov. 7, 2014, 13 pages.
U.S. Appl. No. 12/345,634 Office Action dated Aug. 2, 2011, 21 pages.
U.S. Appl. No. 12/345,634 Office Action dated Oct. 20, 2011, 20 pages.
U.S. Appl. No. 12/345,634 Office Action dated Feb. 16, 2012, 25 pages.
U.S. Appl. No. 12/345,634 Office Action dated Jul. 3, 2012, 17 pages.
U.S. Appl. No. 12/345,634 Office Action dated Oct. 23, 2012, 18 pages.
U.S. Appl. No. 12/345,634 Office Action dated May 17, 2013, 28 pages.
U.S. Appl. No. 12/345,634 Examiner's Answer dated Jul. 18, 2014, 14 pages.
U.S. Appl. No. 14/191,528, Notice of Allowance dated Aug. 28, 2015, 15 pages.
U.S. Appl. No. 14/191,528, Office Action dated Nov. 3, 2014, 27 pages.
Marvie et al., "A Vrml97-X3D Extension for Massive Scenery Management in Virtual Worlds", IEEE/ACM Digital Library 2004, pp. 145-153, 188.
Hadjiefthymiades et al., "Using Proxy Cache Relocation to Accelerate Web Browsing in Wireless/Mobile Communications", ACM Digital Library, WWW10, May 1-5, 2001, Hong Kong, pp. 26-35.
He et al., "Path and cache conscious prefetching (PCCP)", ACM Digital Library, The VLDB Journal (2007), pp. 235-249.
Minh Chau Nguyen, USPTO Office Action, U.S. Appl. No. 12/473,306, Mail Date Jun. 9, 2011, 21 pages.
Minh Chau Nguyen, USPTO Final Office Action, U.S. Appl. No. 12/473,306, Mail Date Mar. 29, 2012, 21 pages.
Minh Chau Nguyen, USPTO Office Action, U.S. Appl No. 12/473,306, Notification Date Feb. 27, 2014, 22 pages.
Minh Chau Nguyen, USPTO Final Office Action, U.S. Appl. No. 12/473,306, Notification Date Sep. 10, 2014, 14 pages.
Minh Chau Nguyen, USPTO Notice of Allowance and Fee(s) Due, U.S. Appl. No. 12/473,306, Date Mailed Nov. 7, 2014, 13 pages.
U.S. Appl. No. 12/548,831, Notice of Allowance dated Sep. 16, 2015, 10 pages.

PRE-FETCHING ITEMS IN A VIRTUAL UNIVERSE BASED ON AVATAR COMMUNICATIONS

RELATED U.S. APPLICATION DATA

The present patent document is a continuation of U.S. patent application Ser. No. 12/473,306, filed May 28, 2009, entitled "PRE-FETCHING ITEMS IN A VIRTUAL UNIVERSE BASED ON AVATAR COMMUNICATIONS", the disclosure of which is incorporated herein by reference.

FIELD OF THE INVENTION

This invention relates generally to virtual universes (VUs) and more specifically to the pre-fetching of items based upon communications between avatars in a VU.

BACKGROUND OF THE INVENTION

Virtual universes (VUs) or virtual worlds are computer-based simulated environments intended for its users or residents to inhabit and interact via avatars, which are personas or representations of the users of the virtual universes. VUs are also known as metaverses or "3D Internet". These types of virtual universes are now most common in multiplayer online games, such as Second Life®, which is a trademark of Linden Research Inc. in the United States. Avatars in these types of virtual universes, which can number well over a million, have a wide range of business and social experiences.

Many regions of virtual worlds contain complex environments with large numbers of objects. Presently, virtual universes only cache a user's avatar or items the avatar is wearing or attached to the avatar and the object, textures and scripts within a predefined proximity of the avatar. Therefore, a user may experience delays when traversing regions as objects are downloaded upon entrance or while in transit to a region. Caching or pre-fetching objects by proximity may not provide the optimal experience for most users. The time to display an object varies by the size of the object and is constrained by download speed to the virtual universe client. It is conceivable that by the time an object is retrieved from the server, the user may have moved to a different location and not seen an object they were interested in or the land owner may want them to see.

SUMMARY OF THE INVENTION

The present invention smartly pre-fetches objects, textures, and scripts (collectively referred to herein as items) through analysis of the communications of an avatar. Furthermore, if an object, texture, or script is not pre-fetched upon arrival to a region, the virtual universe's object, texture and script download system is augmented to prioritize objects the user may be interested in based on the avatar's communications and previously stated priorities. The present invention may improve user experience of virtual world by prioritizing the download and caching of objects, textures, and scripts that are likely to interest the user. Such a prioritization enhances the user experience by reducing wait times for the rendering of objects of interest.

A first aspect of the present invention provides a method for pre-fetching items in a virtual universe (VU) based on avatar communications, comprising: analyzing communications between a set of avatars in the VU; extracting a set of terms from the communications based on the analysis; ranking the set of terms based on at least one of a frequency, a recency, and a relevance of the set of terms as used in the communications; and calculating a relative priority of each of the set of terms based on the ranking.

A second aspect of the present invention provides a system for pre-fetching items in a virtual universe (VU) based on avatar communications, comprising: a module for analyzing communications between a set of avatars in the VU; a module for extracting a set of terms from the communications based on the analysis; a module for ranking the set of terms based on at least one of a frequency, a recency, and a relevance of the set of terms as used in the communications; and a module for calculating a relative priority of each of the set of terms based on the ranking.

A third aspect of the present invention provides a computer readable medium containing a program product for pre-fetching items in a virtual universe (VU) based on avatar communications, the computer readable medium comprising program code for causing a computer to: analyze communications between a set of avatars in the VU; extract a set of terms from the communications based on the analysis; rank the set of terms based on at least one of a frequency, a recency, and a relevance of the set of terms as used in the communications; and calculate a relative priority of each of the set of terms based on the ranking.

A fourth aspect of the present invention provides a method for deploying a system for pre-fetching items in a virtual universe (VU) based on avatar communications, comprising: providing a computer infrastructure being operable to: analyze communications between a set of avatars in the VU; extract a set of terms from the communications based on the analysis; rank the set of terms based on at least one of a frequency, a recency, and a relevance of the set of terms as used in the communications; and calculate a relative priority of each of the set of terms based on the ranking.

A fifth aspect of the present invention provides a data processing system for pre-fetching items in a virtual universe (VU) based on avatar communications, comprising: a memory medium comprising instructions; a bus coupled to the memory medium; and a processor coupled to the bus that when executing the instructions cause the data processing system to: analyze communications between a set of avatars in the VU; extract a set of terms from the communications based on the analysis; rank the set of terms based on at least one of a frequency, a recency, and a relevance of the set of terms as used in the communications; and calculate a relative priority of each of the set of terms based on the ranking.

BRIEF DESCRIPTION OF THE DRAWINGS

These and other features of this invention will be more readily understood from the following detailed description of the various aspects of the invention taken in conjunction with the accompanying drawings in which.

Figure 1:
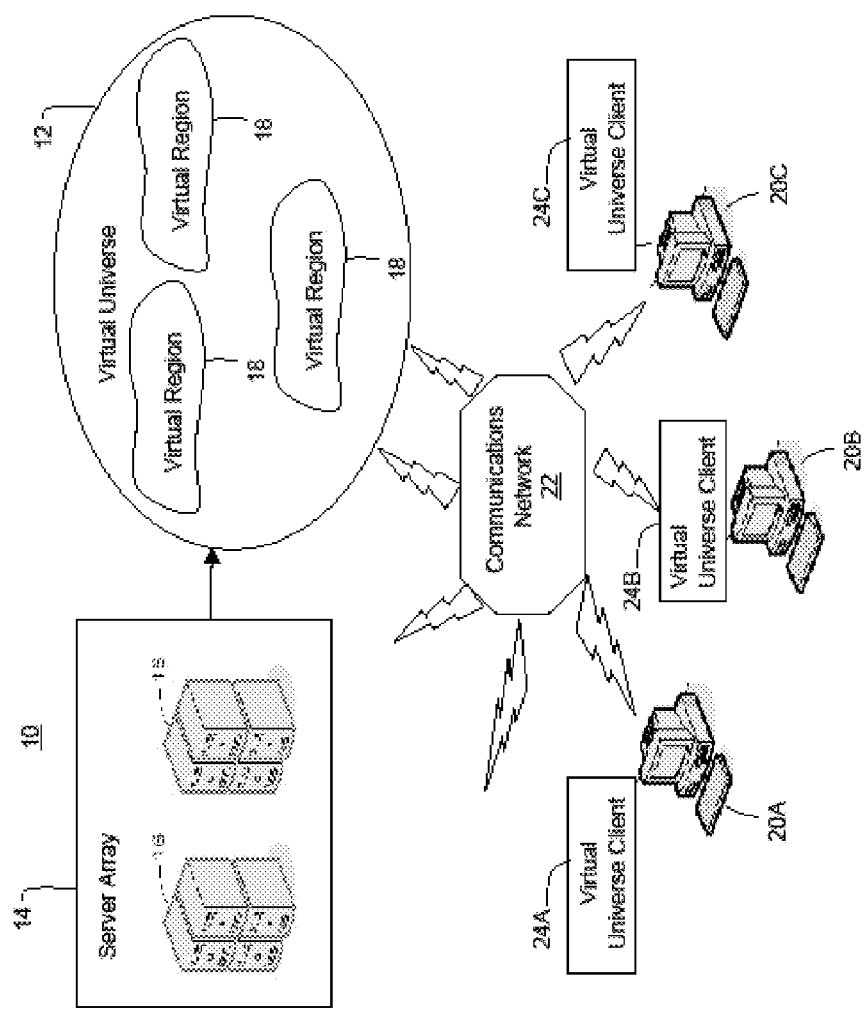
FIG. 1 shows a high-level schematic diagram showing a networking environment for providing a virtual universe according to one embodiment of this invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:
I. VU concepts Defined
II. General Description
  A. Core Description
  B. Additional Features
III. Computerized Implementation I. VU Concepts Defined (1) An avatar is a graphical representation the user selects that others can see, often taking the form of a cartoon-like human.

(2) An agent is the user's account, upon which the user can build an avatar, and which is tied to the inventory of assets the user owns.

(3) A region is a virtual area of land within the VU, typically residing on a single server.

(4) Assets, avatars, the environment, and anything visual includes of UUIDs tied to geometric data (distributed to users as textual coordinates), textures (distributed to users as graphics files such as JPEG2000 files), and effects data (rendered by the user's client according to the user's preferences and user's device capabilities).

(5) Objects in a virtual universe are composed of one or more primitive objects such as cones, triangles and polygons. The more detailed an object is (i.e., the more primitive objects it is composed of) the longer the object will take to render and download. It is common for virtual world regions to incorporate many objects in their design.

(6) Cache—A cache is a collection of data duplicating original values stored elsewhere or computed earlier, where the original data is expensive to fetch (due to slow access time) or to compute, relative to the cost of reading the cache. A cache is a temporary storage area where frequently accessed data can be stored for rapid access. Once the data is stored in the cache, future use may access the cached copy rather than re-fetching or re-computing the original data, resulting in a lower average access time.

(7) Rendering—Rendering is the process of producing the pixels of an image from a higher-level description of its components. Additionally, rendering is the process of generating an image from a model by means of computer programs. The model is a description of three dimensional objects in a strictly defined language or data structure. Models contain geometry, viewpoint, and texture (8) Items refer to anything capable of being downloaded, displayed, and/or used in a virtual universe. Examples include, among other things, objects, textures, advertisements, scripts, etc.

II. General Description

A. Core Description

The present invention smartly pre-fetches objects, textures, and scripts (collectively referred to herein as items) through analysis of the communications of an avatar. Furthermore, if an object, texture, or script is not pre-fetched upon arrival to a region, the virtual universe's object, texture, and script download system is augmented to prioritize objects the user may be interested in based on the avatar's communications and previously stated priorities. The present invention may improve user experience of a virtual world by prioritizing the download and caching of objects, textures, and scripts that are likely to interest the user. Such a prioritization enhances the user experience by reducing wait times for the rendering of objects of interest.

FIG. 1 shows a high-level schematic diagram showing a networking environment 10 for providing a virtual universe 12 according to one embodiment of this invention in which monitoring user demographics within the virtual universe can be utilized. As shown in FIG. 1, networking environment 10 comprises a server array or grid 14 comprising a plurality of servers 16 each responsible for managing a portion of virtual real estate within virtual universe 12. A virtual universe provided by a multiplayer online game, for example, can employ thousands of servers to manage all of the virtual real estate. The virtual content of the virtual real estate that is managed by each of servers 16 within server array 14 shows up in virtual universe 12 as a virtual region 18 made up of objects, textures, and scripts.

Like the real world, each virtual region 18 within virtual universe 12 comprises a landscape having virtual content, such as buildings, stores, clubs, sporting arenas, parks, beaches, cities and towns all created by administrators or residents of the universe that are represented by avatars. These examples of virtual content are only illustrative of some things that may be found in a virtual region and are not limiting. Furthermore, the number of virtual regions 18 shown in FIG. 1 is only for illustrative purposes and those skilled in the art will recognize that there may be many more regions found in a typical virtual universe, or even only one region in a small virtual universe. FIG. 1 also shows that users operating computers 20A-20C (hereinafter referred generally as 20) interact with virtual universe 12 through a communication network 22 via virtual universe clients 24A-24C (hereinafter referred generally as 24) that reside in computers 20, respectively. Below are further details of virtual universe 12, server array 14, and virtual universe client 24.

One of the ways that users of virtual universe 12 can use virtual universe client 24 to interact with the universe is to view advertising content within the virtual universe. An illustrative but non-limiting listing of advertisements that can be viewed through virtual universe client 24 includes items such as billboards, store window display, etc. As will be further described herein, embodiments of this invention are directed to facilitating the management of these advertisements assets in virtual universe 12.

Figure 2:
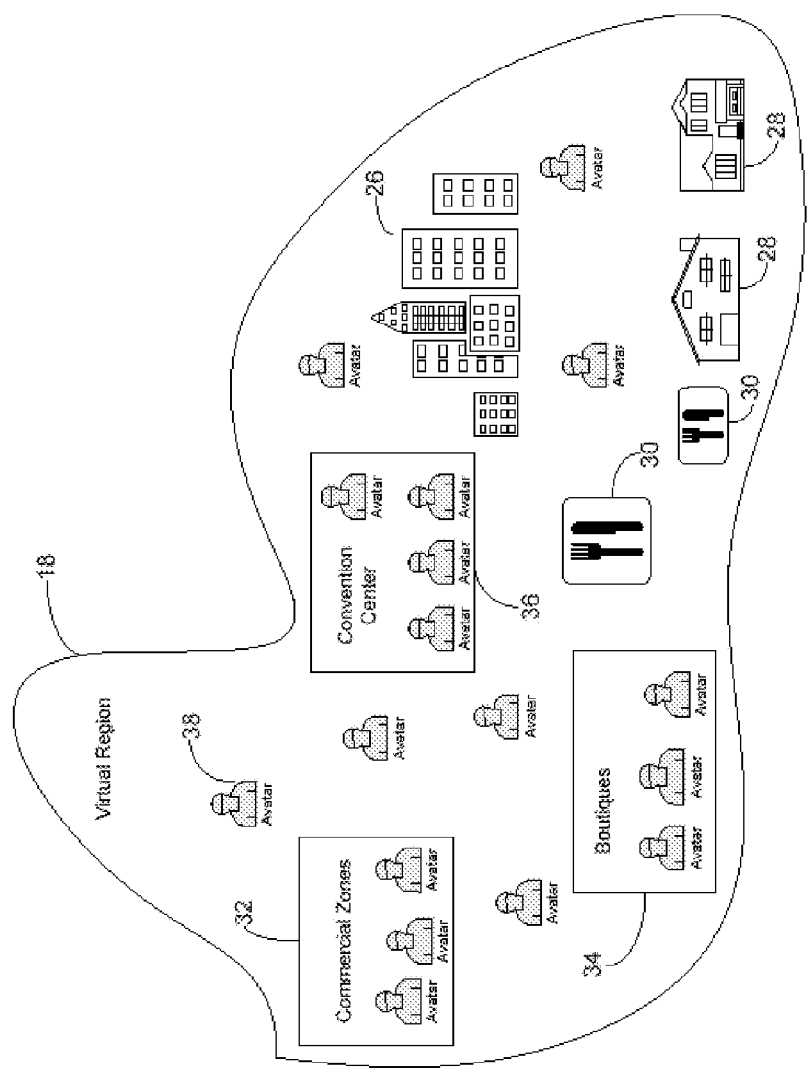
FIG. 2 shows a more detailed view of a virtual region shown in the virtual universe of FIG. 1.

FIG. 2 shows a more detailed view of what one virtual region 18 in virtual universe 12 may comprise. As an example, virtual region 18 shown in FIG. 2 comprises a downtown office center 26, homes 28, restaurants 30, a supermarket 32 and a shopping mall 34 for shopping, and a convention center 36 for meetings and various conventions. Residents or avatars 38, which as mentioned above, are personas or representations of the users of the virtual universe, which that who roam all about the virtual region by walking, driving, flying, or even by teleportation or transportation, which is essentially moving through space from one point to another, more or less instantaneously. These examples of virtual content in virtual region 18 shown in FIG. 2 are only illustrative of some items that may be found in a virtual region and those skilled in the art will recognize that these regions can have many more items that can be found in the real world universe as well as things that do not presently exist in the real world.

Figure 3:
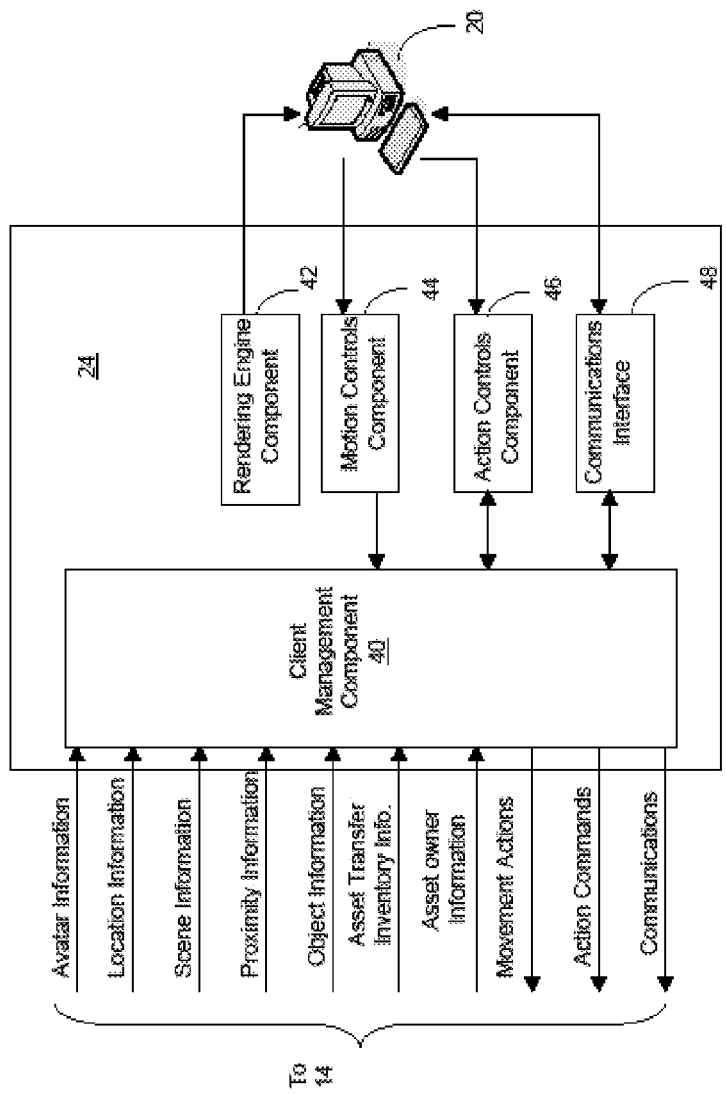
FIG. 3 shows a more detailed view of the virtual universe client shown in FIG. 1.

FIG. 3 shows a more detailed view of virtual universe client 24 shown in FIG. 1. Virtual universe client 24, which enables users to interact with virtual universe 12, comprises a client management component 40, which manages actions, commands, and communications made by a user through computer 20, and information received from the virtual universe through server array 14. A rendering engine component 42 enables the user of computer 20 to visualize his or her avatar within the surroundings of the particular region of virtual universe 12 in which the avatar is presently located.

A motion controls component 44 enables the user's avatar(s) to make movements through the virtual universe. In one embodiment, movements through the virtual universe can include, for example, gestures, postures, walking, running, driving, flying, etc. An action controls component 46 and enables the user to perform actions in the virtual universe such as buying items for his or her avatar or even for their real-life selves, building homes, planting gardens, etc. These actions are only illustrative of some possible actions that a user can perform in the virtual universe and are not limiting. A communications interface 48 enables a user to communicate with other users of virtual universe 12 through modalities such as chatting, instant messaging, gesturing, talking, and electronic mail (e-mail).

FIG. 3 shows the various types of information received by client management component 40 from the virtual universe through the server array 14. In particular, client management component 40 receives avatar information about the avatars that are in proximity to the user's avatar. In addition, client management component 40 receives location information about the area that the user's avatar is near (e.g., what region or island he or she is in), as well as scene information (e.g., what the avatar sees). Client management component 40 also receives proximity information, which contains information on what the user's avatar is near, and object information, which is information about nearby objects. Client management component 40 receives avatar and location information, which information is utilized by the demographic tracking utility 53. FIG. 3 also shows the movement commands and action commands that are generated by the user and sent to the server array via client management component 40, as well as the communications that can be sent to the users of other avatars within the virtual universe.

Figure 4:
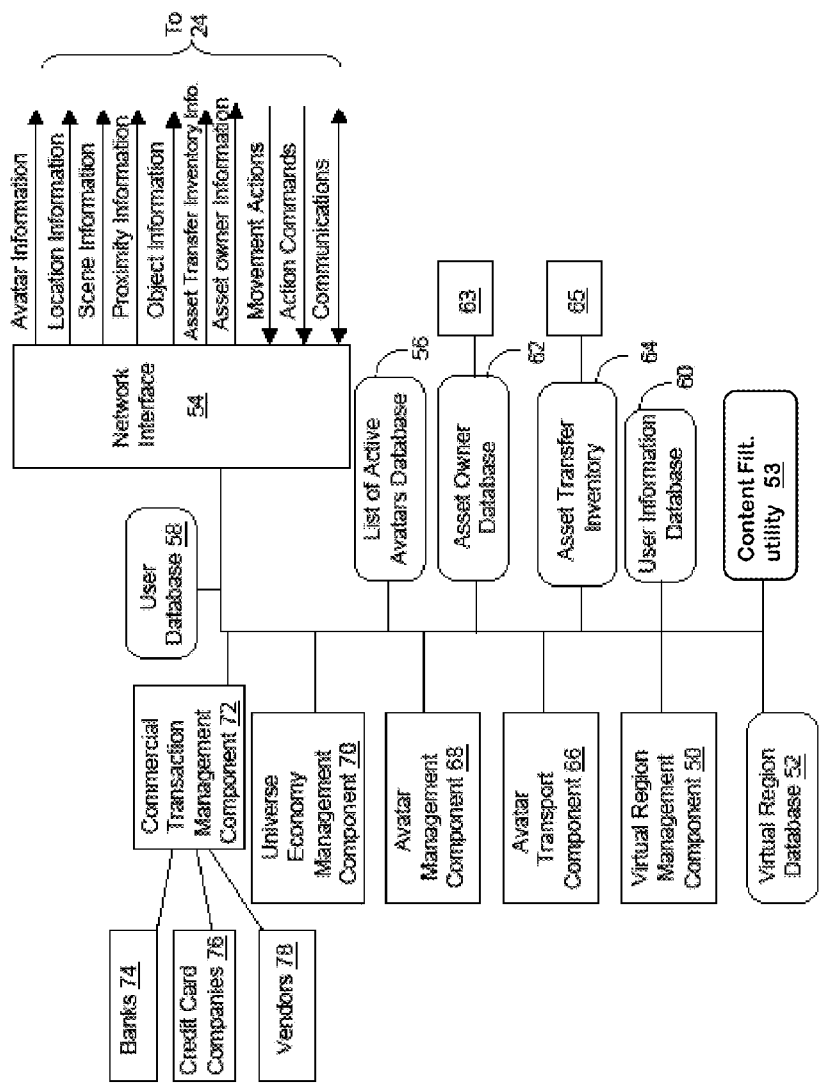
FIG. 4 shows a more detailed view of some of the functionalities provided by the server array shown in FIG. 1.

FIG. 4 shows a more detailed view of some of the functionalities provided by server array 14 shown in FIG. 1. In particular, FIG. 4 shows a virtual region management component 50 that manages a virtual region(s) within the virtual universe. Virtual region management component 50 manages what happens in a particular region, such as the type of landscape in that region, the number of homes, commercial zones, boutiques, streets, parks, restaurants, etc. For example, virtual region management component 50 would allow the owner of a particular region or establishment within the region to specify requirements for entering or remaining within the region that could potentially affect certain avatar characteristics. Those skilled in the art will recognize that virtual region management component 50 can manage many other facets within the virtual region.

FIG. 4 shows a network interface 54 that enables server array 14 to interact with virtual universe client 24 residing on computer 20. In particular, network interface 54 communicates active avatar, location, scene, proximity, script, object, asset transfer inventory, asset owner, user database, and user information to the user through virtual universe client 24. The network interface receives movement and action commands, as well as communications from the user via virtual universe client 24.

FIG. 4 also shows a pre-fetching utility 53, which provides functionality of the present invention such as to pre-fetch/cache items based on communications between avatars, as will be further described below. In this embodiment, pre-fetching utility 53 resides on the same computer system as server array 14, and communicates directly to virtual universe 12 and its users via virtual universe client 24. In other embodiments, pre-fetching 53 might reside on the same computer as virtual universe client 24, have components that reside on both server array 14 and virtual universe client 24, or reside on separate computers in direct communication with virtual universe servers 16 and virtual universe clients 24.

As shown in FIG. 4, there are several different databases for storing information. In particular, virtual region database 52 stores information on all of the specifics in virtual region 18 that virtual region management component 50 is managing. Virtual region database 52 contains metadata information about the objects, texts, and scripts associated with the virtual content in the virtual region(s). Active avatars database 56 contains a list of all the avatars that are online in the virtual universe 12, while databases 58 and 60 contain information on the actual human users or avatars in the virtual universe 12. In one embodiment, user database 58 contains general information on the users such as names, email addresses, locales, interests, ages, preferences, etc., while user information database 60 contains more sensitive information on the users such as billing information (e.g., credit card information) for taking part in transactions.

Databases 52, 56, 58, 60 and 63 contain information on the avatars of the users that reside in virtual universe 12. In one embodiment, virtual region database 52, list of active avatars database 56, user database 58, user information database 60, and asset owner database 63 are tracked for avatars within a multidimensional space of the virtual region 18. The information is typically in the form of metadata associated with the virtual content of each user's avatar(s). An illustrative but non-limiting list of avatar usage information includes appearance, asset inventory, past activities, and purchases. Those skilled in the art will recognize that this listing of avatar usage information is illustrative of possible items and is not exhaustive. For example, other user information may include name of the owner, e-mail address of the owner, address of the originating computer, or any other type of user information.

Each item may be associated with a piece of executable code or other data called a script, which may affect rendering in some fashion during a session in the virtual universe. A clothing asset, for example, may be rendered with a script that causes the clothing to shimmer. A virtual pet, in another example, may render as an automated avatar that follows the user's avatar within the virtual universe.

Virtual region database 52, list of active avatars database 56, user database 58, user information database 60, and asset owner database 63 are databases that contain item information within pre-fetching utility 53. In an exemplary embodiment, asset transfer inventory 64 comprises a listing table 65 having a foreign key to an asset table 63 within asset owner database 62, such that querying the asset transfer inventory 64 pulls information from asset table 63 to listing table 65. Those skilled in the art will recognize that other techniques for transferring data between databases 52, 56, 58, 60 and 63 are possible within the scope of the invention.

Those skilled in the art will also recognize that databases 52-63 may contain additional information if desired. Databases 52-63 may be consolidated into a single database or table, divided into multiple databases or tables, or clustered into a database system spanning multiple physical and logical devices. Further, although the above information is shown in FIG. 4 as being stored in databases, those skilled in the art will recognize that other configurations and means of storing information can be utilized. For example, virtual region database 52, list of active avatars database 56, user database 58, user information database 60, and asset owner database 63 might reside on the same computers as virtual universe client 24, and have components that reside on both server array 14 and virtual universe client 24, or reside on separate computers in direct communication with virtual universe servers 16 and virtual universe client 24.

An avatar transport component 66 enables users, as mentioned above, to transport through space from one point to another point instantaneously. As a result, an avatar could, for example, travel from a business region to an entertainment region to experience a concert.

An avatar management component 68 keeps track of what the avatars are doing while in the virtual universe. For example, avatar management component 68 can track where each avatar is presently located in the virtual universe, as well as what activities it is performing or has recently performed. An illustrative but non-exhaustive list of activities can include shopping, eating, talking, recreating, etc.

Because a typical virtual universe has a vibrant economy, server array 14 has functionalities that are configured to manage the economy. In particular, a universe economy management component 70 manages transactions that occur within the virtual universe between avatars. In one embodiment, virtual universe 12 will have its own VU currency ($VU) that users pay for with real-life money. The users can then take part in commercial transactions for their avatars through universe economy management component 70. For example, an avatar might want to pay for a service that provides discovery and transfer of assets within the virtual universe. In this case, the avatar would make the purchase of this service using the VU. In some instances, the user may want to take part in a commercial transaction that benefits him or her and not an avatar. In this case, a commercial transaction management component 72 allows the user to participate in the transaction. For example, while walking around a commercial zone, a user may see a pair of shoes that he or she would like for themselves and not the user's avatar. In order to fulfill this type of transaction and others similarly related, commercial transaction management component 72 interacts with banks 74, credit card companies 76, and vendors 78.

Figure 5:
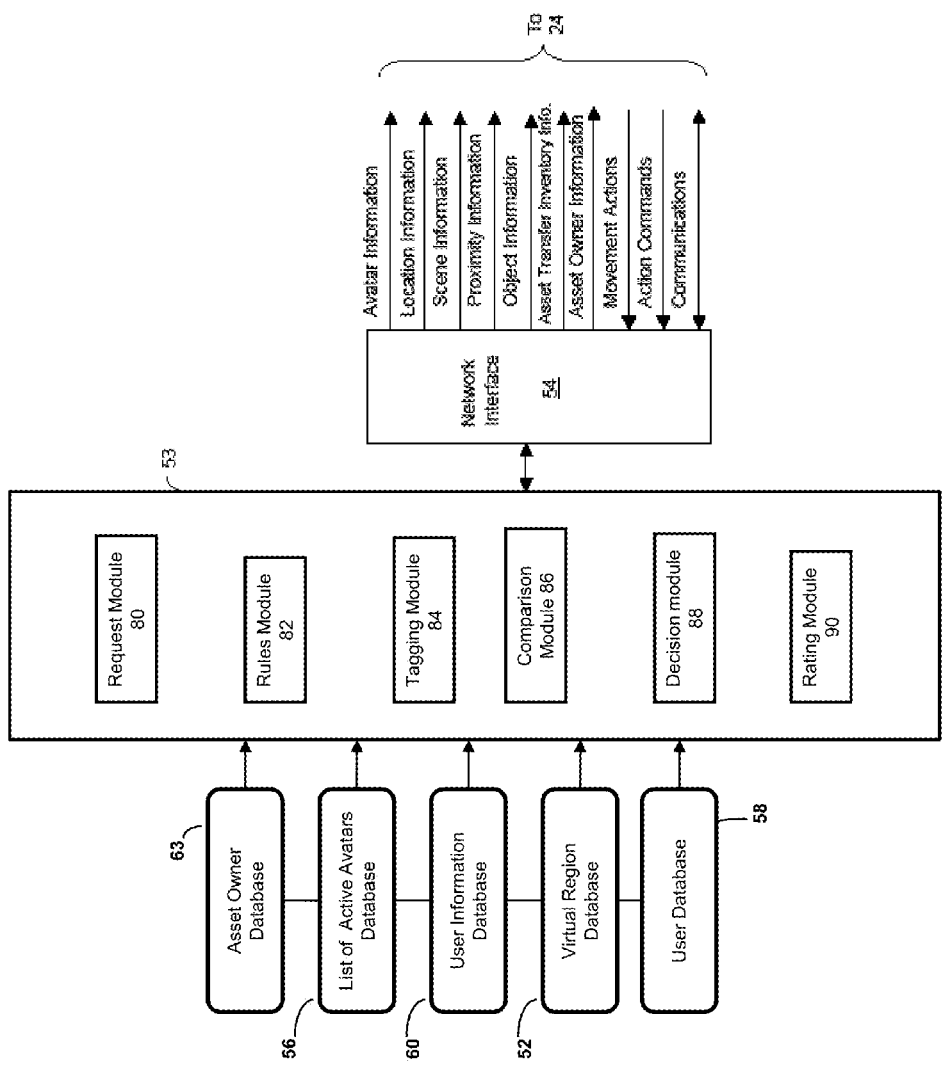
FIG. 5 shows a more detailed diagram of the pre-fetching utility of FIG. 4.

Referring now to FIG. 5, pre-fetching utility 53 according to embodiments of the invention will be described in further detail. As shown in FIG. 5, pre-fetching utility 53 comprises communications analysis module 80, term extraction module 82, ranking module 84, prioritization module 86, pre-fetching/caching module 88, and filtering module 90. These modules will be explained in greater detail below in conjunction with the tables below, but in general: communications analysis module 80 analyzes communications between a set of avatars in the VU; term extraction module 82 extracts a set of terms from the communications based on the analysis; ranking module 84 ranks the set of terms based on at least one of a frequency, a recency, a relevance, and optionally a trust of source of the set of terms as used in the communications; prioritization module 86 calculates a relative priority of each of the set of terms based on the ranking pre-fetching/caching and module 88 pre-fetches and/or caches at least one item based on the relative priority (e.g., at least one item having a higher relative priority than other items); filtration module 90 compares the set of terms to a database of terms and filters the set of terms based on the comparison. Typically, the database of terms comprises terms typically associated with spam.

As will be further described below, the present invention provides methods to determine potential objects of interest to users to enable smart pre-fetching of items and to augment virtual universe client download systems to fetch items that are most likely of interest to the user before items that are less likely of interest. Along these lines, the present invention will provide an item ranking calculation. Specifically, as an avatar engages in communications with other avatars, they receive and express information about their interests and their priorities. Examples might include:

"I really liked the weather vanes at that store."
"Was that the place with the whale weather vane?"

Two such conversations could indicate a user's interest in weather vanes. Other communications that might express data useful to prioritizing caching would include region related information, such as an avatar receiving communications such as:

"I saw a great weather vane. You would like it. It's over in the Cygnus region."
"Have you ever been over to Lakamaka? They have a weather vane store there."

While these communications might reinforce a pre-existing preference for weather vanes, they also indicate specific information about regions that can be used to prioritize the caching mechanisms. An avatar's communications may be analyzed (via communications analysis module 80) to extract relevant metadata terms (via term extraction module 82). The analysis may include methods such as discarding conjunctions and prepositions, or may include extraction of explicit nouns and verbs. Once the communications have been analyzed, extracted metadata of interest may be tracked and ranked for frequency, recency, and relevance (via ranking module 84).

Frequency—Analysis can indicate how often a given metadata term is contained in avatar communications. Each time a metadata element is extracted from communications, it may be compared to a database of previously extracted terms. If a term is already within the database, the frequency count may be increased. Terms used and heard more often likely indicate greater significance to the user.

Recency—As more recently heard and used terms are likely to reflect the current interests of a user, the date and time associated with a given element of metadata may also be recorded and used as a basis of analysis.

Relevance—Some terms may have greater relevance to a user, either by being explicitly prioritized by a user or by being linked to other metadata terms already present. Such association may be determined through a plurality of methods, including consulting a third party, such as a folksonomy, or collaborative tagging data source to identify frequently associated terms.

Taken together, frequency, recency, and relevance can be quantified, analyzed, and used to set a relative priority for every term contained in a user's record of metadata of interest as determined by communication analysis. This prioritized ranking may be applied to client download systems to determine the optimal means of providing the user with relevant content.

Example Embodiment

The included example embodiment describes one possible method of implementing the described ranking algorithm. In this example, the frequency of communications predominantly determines the rank of each item.

Consider the following two conversations, held two months apart:

Conversation 1
Avatar 1: "Have you seen any cool weather vanes lately?"
Avatar 2: "I saw one over in Cygnus a couple of weeks back, near a barn."
Avatar 1: "Thanks, I may check that out."
Conversation 2
Avatar 3: "Hey, are you still interested in weather vanes?"
Avatar 1: "Yes, some. Why—seen any good ones?"
Avatar 3: "I saw one shaped like a lemur over in Lakamaka, and it made me think of you."

A communications analysis built to extract only nouns (discarding pronouns) might extract the following table of metadata terms and frequencies from these conversations. This is shown in the following table:

| TERM | FREQUENCY |
|---|---|
| Weathervanes | 2 |
| Cygnus | 1 |
| barn | 1 |
| lemur | 1 |
| Lakamaka | 1 |

Further analysis might be applied to determine the recency of the communications, enabling the method to prioritize more recent communications.

| TERM | FREQUENCY | RECENCY (Months ago mentioned) |
|---|---|---|
| weather vanes | 2 | 0 |
| Cygnus | 1 | 2 |
| barn | 1 | 2 |
| lemur | 1 | 0 |
| Lakamaka | 1 | 0 |

Additional analysis may be applied to determine the relevance of the terms to other data within the table. Such analysis may include consulting a third party, such as a folksonomy, and returning a positive result for each time a term is directly associated with another term already in the table.

| TERM | FREQUENCY | RECENCY (Months ago mentioned) | RELEVANCE |
|---|---|---|---|
| weather vanes | 2 | 0 | 1 (barn) |
| Cygnus | 1 | 2 | 0 |
| barn | 1 | 2 | 1 (weather vanes) |
| lemur | 1 | 0 | 0 |
| Lakamaka | 1 | 0 | 0 |

Based on this analysis, the invention may determine a relative priority for each of the terms contained in the database. While many methods might be used, we consider a simple method that starts with frequency, subtracts the number of months since the term was last used, and adds together the number of relevant terms linked by folksonomy analysis to determine a priority (e.g., priority=frequency−recency+relevance). More complex or alternate prioritization methods may be employed.

| TERM | FREQUENCY | RECENCY (Months ago mentioned) | RELEVANCE | PRIORITY |
|---|---|---|---|---|
| weather vanes | 2 | 0 | 1 (barn) | 3 = 2 − 0 + 1 |
| Cygnus | 1 | 2 | 0 | −1 = 1 − 2 + 0 |
| Barn | 1 | 2 | 1 (weather vanes) | 0 = 1 − 2 + 1 |
| Lemur | 1 | 0 | 0 | 1 = 1 − 0 + 0 |
| Lakamaka | 1 | 0 | 0 | 1 = 1 − 0 + 0 |

Such a method would then prioritize, in order:
(1) weather vanes
(2) lemur
(3) Lakamaka
(4) barn
(5) Cygnus B. Additional Features Client Download System Augmentation—Under the present invention, when an avatar enters a new region or traverses a region, a client download system is invoked to download the textures, scripts, and objects required to render the region. The present invention augments and enhances the client download system. The augmentations permit the virtual universe to render objects most likely to be important to the user before other objects using the values from the previously described object ranking system. As objects enter the rendering radius of an avatar, the object's metadata is compared to the previously computed metadata ranking. If a plurality of objects enters the rendering radius of a user, the objects containing higher ranking metadata terms are downloaded and rendered before those with lower ranking or no metadata terms. The present invention is particularly effective when a virtual universe client must download and render a multitude of objects, such as when teleporting or entering a new region. In some embodiments, after this method is executed for the visible region, the process is executed for the surrounding region and the highest ranked objects, textures, and scripts are cached. Such an embodiment may result in an improved user experience as the most likely to be used objects within the region will not require a download as they enter the visible region.

Caching/Pre-fetch—The virtual universe client's texture, object, and script cache system may be augmented to cache objects, scripts, and textures most likely to be of future interest to a user. Potential enhancements using the previously described ranking system are disclosed below:

Most Popular—The metadata for the most popular objects, textures, and scripts in the virtual universe are inspected and compared to the metadata terms generated by analysis of the avatar's communications. The most popular items that are also highly ranked by the previously described ranking system are downloaded and cached for later potential use. The virtual universe may determine the most popular objects known analytics. Most popular objects may be the objects that are most rendered, most placed in inventory, most placed in regions, etc.

Recently Visited—It is known for virtual universes to cache objects, textures, and scripts for regions recently visited by a user. It is also known for such systems to expire or delete items from its cache as the user visited other regions. Commonly objects are expired based on duration in the cache. The objects that have been in the cache for the longest period of time are deleted prior to objects that have more recently been cached. The present invention augments the cache expiration system to expire objects that are of least interest to the user. In such a system, when an object in the cache must be expired, due to cache size constraints, the object(s) in the cache that contain metadata terms without an associated ranking or the lowest ranking by the ranking calculation system are expired before objects with higher ranking metadata terms.

Specifically Communicated Data—Some communications include specific, explicit reference to a cacheable entity. An example might be "Hey, check out the weather vane store at www.xxx.xyz.weathervane.com." In cases such as these, we may choose to explicitly pre-fetch the textures and metadata-prioritized content from these regions. Thus, if the user does decide to follow such a link, their experience will be improved by not having to wait for downloads.

Analyzed Regions—In the case where regions are among the data extracted from communications, it may be advantageous to pre-fetch objects, textures, and scripts from those regions. While such pre-fetching would be handled at a priority lower to that of local objects, it would enable more rapid transitions to other regions. By mining the avatar's communications, regions that are likely to be visited in the future can be enhanced. Note further that applications may be pre-fetched within a virtual environment based on media and file types found within an inventory. For instance, virtual-world compatible business applications or media players can be preemptively downloaded upon entry of an avatar into a given virtual region. Finally, complementary media can be pre-fetched, as indicated by the existence of certain media within a user's inventory.

Advertisement Protection—A proposed enhancement to this method would include offering the ability to compare conversationally mined keywords against a database of known terms for prioritization or de-prioritization. This would enable a central system to track advertisements or spam and to prevent these terms from influencing prioritization systems. For instance, if an advertiser hired avatars to frequently mention their product in conversations with other avatars, in an effort to expose it to more avatars, this system could provide a means to prevent such avatar based commercials from being effective. This protects against virtual spam, where avatars (either user controlled or automated) simply repeat keywords.

User Prioritization—Avatars or users more closely associated with an avatar might be granted higher priority than unknown users. An addition to the prioritization mechanism might analyze an avatar's perceived relationship or relative trust when prioritizing their metadata additions. An example might be a simple prioritization system where trust ranged from 1-3. Each user an avatar meets begins with a rating of 1, and is increased only when the user specifically validates them and increases their rating such as shown in the chart below (priority=frequency−recency+relevance+trust of source):

| TERM | FREQUENCY | RECENCY (Months ago mentioned) | RELEVANCE | TRUST OF SOURCE | PRIORITY |
|---|---|---|---|---|---|
| weather vanes | 2 | 0 | 1 (barn) | 3 (self, Avatar 3) | 6 = 2 − 0 + 1 + 3 |
| Cygnus | 1 | 2 | 0 | 2 (Avatar 2) | 1 = 1 − 2 + 0 + 2 |
| Barn | 1 | 2 | 1 (weather vanes) | 2 (Avatar 2) | 2 = 1 − 2 + 1 + 2 |
| lemur | 1 | 0 | 0 | 1 (Avatar 3) | 2 = 1 − 0 + 0 + 1 |
| Lakamaka | 1 | 0 | 0 | 1 (Avatar 3) | 2 = 1 − 0 + 0 + 1 |

A further enhancement of this user prioritization might draw from a more comprehensive source for user ratings. Rather than (or in addition to) a user personally determining the trust rating for each avatar, a third party might maintain central ranking systems. Similar to customer satisfaction ratings used by online merchants, this trust system might enable comments given by well respected avatars to carry more weight than those given by known spam bots. It would also enable users to take advantage of the insights of other users, rather than having to identify spam bots and other nefarious characters themselves.

III. Computerized Implementation

Figure 7:
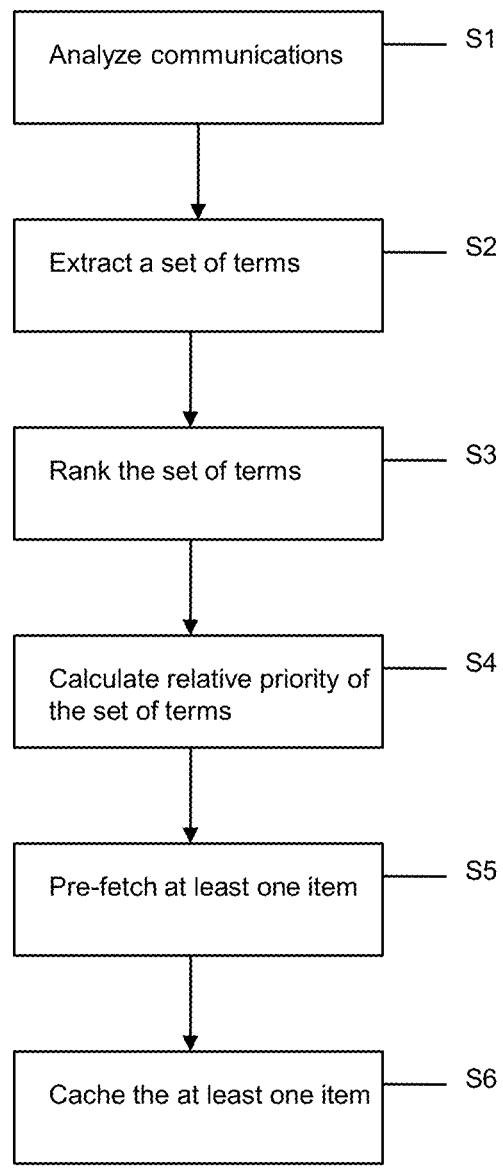
FIG. 7 shows a flow diagram of a method according to one embodiment of the invention.

Referring now to FIG. 7, a computerized implementation 100 of the present invention is shown. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, computer system 104 includes a processing unit 106, a memory 108, a bus 110, and device interfaces 112. Further, item verification system 18 is shown having external devices and storage system 116 that communicate with bus via device interfaces (although image capture device 20 alternatively could directly communicate with bus 110). In general, processing unit 106 executes computer program code, such as pre-fetching utility 53, which is stored in memory 108 and/or storage system 116. While executing computer program code, processing unit 106 can read and/or write data to/from memory 108, storage system 116, and/or device interfaces 112. Bus 110 provides a communication link between each of the components in item verification system 18. Although not shown, item verification system 18 could also include I/O interfaces that communicate with: one or more external devices such as a kiosk, a checkout station, a keyboard, a pointing device, a display, etc.); one or more devices that enable a user to interact with item verification system 18; and/or any devices (e.g., network card, modem, etc.) that enable item verification system 18 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, computer system 104 is only representative of various possible computer systems that can include numerous combinations of hardware. To this extent, in other embodiments, item verification system 18 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external devices. Still further, it is understood that one or more additional components (e.g., system software, math co-processing unit, etc.) not shown in FIG. 7 can be included in item verification system 18.

Storage system 116 can be any type of system capable of providing storage for information under the present invention such as item appearances. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into item verification system 18.

Figure 6:
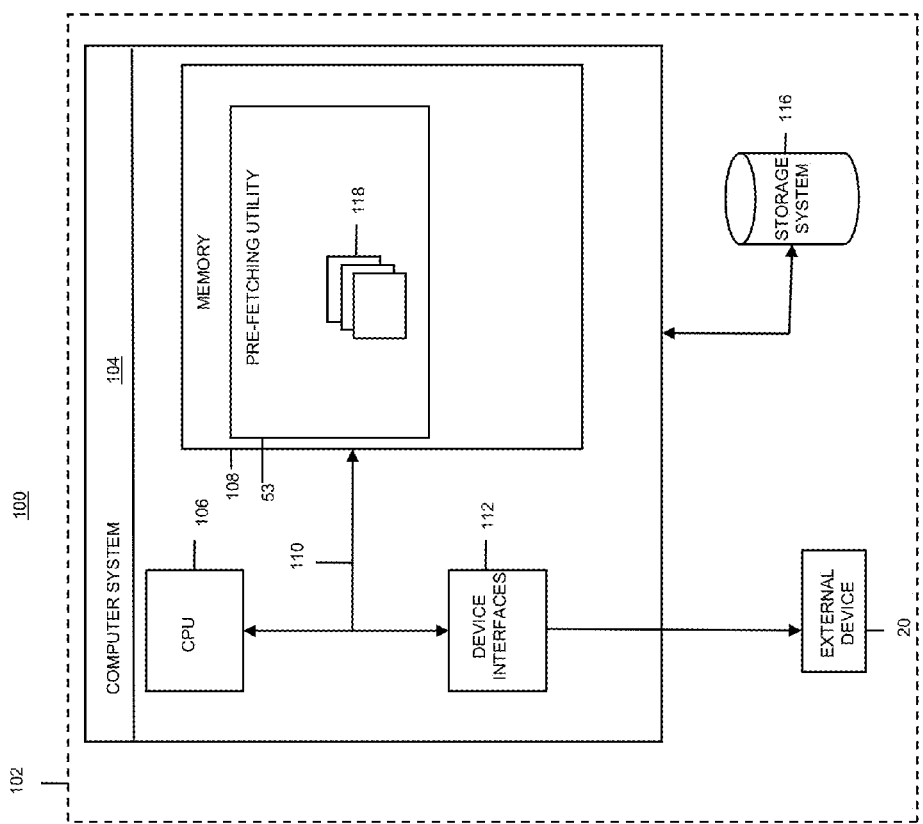
FIG. 6 shows computerized implementation according to one embodiment of the present invention.

Shown in memory 108 of item verification system 18 is pre-fetching utility 53, with a set of modules 118. The modules 118 correspond to those shown in FIG. 5 for pre-fetching utility 53. They have been shown in group format 118 in FIG. 6 to demonstrate that the configuration of FIG. 5 need not be limiting and the same functionality could be accomplished in any quantity and/or configuration of modules. Still yet, set of modules 118 provides the functions of the present invention as described herein. Such functionality will be illustrated using method flow diagram of FIG. 7.

As shown, in step S1, communications between a set of avatars in the VU will be analyzed. In step S2, a set of terms will be extracted from the communications based on the analysis. In step S3, the set of terms will be ranked based on at least one of a frequency, a recency, and a relevance of the set of terms as used in the communications. In step S4, a relative priority of each of the set of terms will be calculated based on the ranking. In step S5, at least one item will be pre-fetched based on the relative priority. In step S6, the at least one item will be cached.

While shown and described herein as a solution for pre-fetching items in a VU, it is understood that the invention further provides various alternative embodiments. For example, in one embodiment, the invention provides a computer-readable/useable medium that includes computer program code to enable a computer infrastructure to provide pre-fetching of items in a VU. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 7) and/or storage system 116 (FIG. 7) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to provide pre-fetching of items in a VU. In this case, the service provider can create, maintain, support, etc., a computer infrastructure, such as computer infrastructure 102 (FIG. 7) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for pre-fetching items in a VU. In this case, a computer infrastructure, such as computer infrastructure 102 (FIG. 7), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as item verification system 18 (FIG. 7), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing a program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A computer-implemented method for pre-fetching items in a virtual universe (VU) in a network based on avatar communications, comprising:
    analyzing, by at least one computing device, a set of words in the avatar communications between a set of avatars in the VU in the network;
    extracting, by at least one computing device, a subset of words from the set of words based on the analysis;
    ranking, by at least one computing device, each word of the subset of words based on a frequency, a recency, and a relevance of the subset of words as used in the communications; and
    calculating, by at least one computing device, a relative priority of the each word of the subset of words based on a calculation comprising subtracting the recency from a sum of the frequency and the relevance.

2. The method of claim 1, further comprising pre-fetching, by at least one computing device, at least one item based on the relative priority.

3. The method of claim 2, the pre-fetching comprising pre-fetching, by at least one computing device, at least one item having a higher relative priority than other items.

4. The method of claim 1, the ranking being further based on a trust of source of the communications.

5. The method of claim 4, the trust of source being based on a relationship between the communications and the set of avatars.

6. The method of claim 1, further comprising caching, by at least one computing device, the at least one item.

7. The method of claim 1, wherein the extracting comprises discarding, by at least one computing device, any pronouns, prepositions, and conjunctions from the set of words to yield the subset of words.

8. The method of claim 1, wherein a service solution provider provides a computer infrastructure that performs the method for one or more consumers.

9. A system for pre-fetching items in a virtual universe (VU) based on avatar communications, comprising:
    a memory medium comprising instructions;
    a bus coupled to the memory medium;
    a processor coupled to the bus that when executing the instructions causes the system to:
        analyze a set of words in communications between a set of avatars in the VU;
        extract a subset of words from the set of words based on the analysis;
        rank each word of the subset of words based on a frequency, a recency, and a relevance of the subset of words as used in the communications; and
        calculate a relative priority of the each word of the subset of words based on a calculation comprising subtracting the recency from a sum of the frequency and the relevance.

10. The system of claim 9, the system further being caused to pre-fetch at least one item based on the relative priority.

11. The system of claim 10, the system further being caused to pre-fetch at least one item having a higher relative priority than other items.

12. The system of claim 9, the system further being caused to catch the at least one item.

13. The system of claim 9, the system further being caused to further rank the subset of words based on a trust of source of the communications, the trust of source being based on a relationship between the communications and the set of avatars.

14. The system of claim 9, wherein the extracting comprises discarding any pronouns, prepositions, and conjunctions from the set of words to yield the subset of words.

15. A computer readable device containing a program product for pre-fetching items in a virtual universe (VU) based on avatar communications, the computer readable device comprising program code for causing a computer to:
    Analyze a set of words in communications between a set of avatars in the VU;
    extract a subset of words from the set of words based on the analysis;
    rank each word of the subset of words based on a frequency, a recency, and a relevance of the subset of words as used in the communications; and
    calculate a relative priority of the each word of the subset of words based on a calculation comprising subtracting the recency from a sum of the frequency and the relevance.

16. The computer readable device containing a program product of claim 15, the computer readable device further comprising program code for causing the computer to: pre-fetch at least one item based on the relative priority.

17. The computer readable device containing a program product of claim 16, the computer readable device further comprising program code for causing the computer to pre-fetch at least one item having a higher relative priority than other items.

18. The computer readable device containing a program product of claim 15, the computer readable device further comprising program code for causing the computer to: cache the at least one item.

19. The computer readable device containing a program product of claim 15, the ranking being further based on a trust of source of the communications, the trust of source being based on a relationship between the communications and the set of avatars.

20. The computer readable device containing a program product of claim 15, wherein the extracting comprises discarding any pronouns, prepositions, and conjunctions from the set of words to yield the subset of words.

* * * * *